US008346021B2

(12) United States Patent
Li et al.

(10) Patent No.: US 8,346,021 B2

(45) Date of Patent: Jan. 1, 2013

(54) CONTENT ADAPTIVE SCALER BASED ON A FARROW STRUCTURE

(75) Inventors: Lin Li, Beijing (CN); Tianjiang Li, Beijing (CN); Wei Che, Beijing (CN); Huide Li, Beijing (CN)

(73) Assignee: Analog Devices, Inc., Norwood, MA (US)

( * ) Notice: Subject to any disclaimer, the term of this patent is extended or adjusted under 35 U.S.C. 154(b) by 666 days.

(21) Appl. No.: 12/505,626

(22) Filed: Jul. 20, 2009

(65) Prior Publication Data

US 2010/0283799 A1 Nov. 11, 2010

Related U.S. Application Data

(60) Provisional application No. 61/175,548, filed on May 5, 2009.

(51) Int. Cl.
*G06K 9/40* (2006.01)
*G06K 9/32* (2006.01)
*G09G 5/00* (2006.01)

(52) U.S. Cl. ........ 382/299; 382/260; 382/298; 382/300; 345/660

(58) Field of Classification Search .................. 382/260, 382/298–300; 345/660

See application file for complete search history.

(56) References Cited

U.S. PATENT DOCUMENTS

| | | | |
|---|---|---|---|
| 4,866,647 | A | 9/1989 | Farrow |
| 6,600,491 | B1 | 7/2003 | Szeliski et al. |
| 6,600,495 | B1 | 7/2003 | Boland et al. |
| 7,324,709 | B1 | 1/2008 | Wang et al. |
| 2006/0139376 | A1 | 6/2006 | Dinh et al. |
| 2006/0269166 | A1 | 11/2006 | Zhong et al. |
| 2007/0152990 | A1 | 7/2007 | Callway |

OTHER PUBLICATIONS

International Search Report dated Jun. 29, 2010, in counterpart international application No. PCT/US2010/033544.

*Primary Examiner* — Vikkram Bali
*Assistant Examiner* — Jose M Torres
(74) *Attorney, Agent, or Firm* — Kenyon & Kenyon LLP

(57) ABSTRACT

Embodiments of the present invention are directed to an image processing system. The image processing system may comprise a content detection module having an input to receive a sequence of input pixels and configured to generate an adjustable parameter based on detected differences between adjacent pairs of input pixels, and a digital filter having an input for the sequence of input pixels and a control input coupled to an output of the content detection module. The digital filter may adjust filtering coefficients according to the parameter.

24 Claims, 9 Drawing Sheets

100

$$C_2 = \alpha\mu_k^{\ 2} - \alpha\mu_k$$

$$C_1 = -\alpha\mu_k^{\ 2} + (\alpha + 1)\mu_k$$

$$C_0 = -\alpha\mu_k^{\ 2} + (\alpha - 1)\mu_k + 1$$

$$C_{-1} = \alpha\mu_k^{\ 2} - \alpha\mu_k$$

FIG. 3

$A = abs(x(n-2) - x(n-1)) >= 96$ $B = 96 > abs(x(n-2) - x(n-1)) >= 64$ $C = 64 > abs(x(n-2) - x(n-1)) >= 32$ $D = 32 > abs(x(n-2) - x(n-1)) >= 16$ $E = abs(x(n-2) - x(n-1)) < 16$ $G = abs(x(n-3) - x(n-2)) > 64 \ \&\& \ abs(x(n-1) - x(n)) > 64$ $H = abs(x(n-3) - x(n-2)) > 32 \ \&\& \ abs(x(n-1) - x(n)) > 32$ $$\alpha = \begin{cases} 1 & \text{if } A == 1 \\ 0.75 & \text{if } B == 1 \\ 0.5 & \text{if } C == 1 \ || \ (D == 1 \ \&\& \ G == 1) \ || \ (E == 1 \ \&\& \ H == 1) \\ 0.25 & \text{if } D == 1 \ \&\& \ G == 0 \\ 0 & \text{if } E == 1 \ \&\& \ H == 0 \end{cases}$$

1000

$$\text{New interpolated pixel After overshoot control} = \begin{cases} \text{max + offset}, & \text{If new calculated value > max + offset} \\ \text{min - offset}, & \text{If new calculated value < min - offset} \\ \text{new calculated value}, & \text{otherwise} \end{cases}$$

FIG. 10

CONTENT ADAPTIVE SCALER BASED ON A FARROW STRUCTURE

CROSS-REFERENCE TO RELATED APPLICATIONS

This application claims priority to U.S. Provisional Patent Application No. 61/175,548, filed May 5, 2009, entitled "Content Adaptive Scaler Based On A Farrow Structure," which is herein incorporated by reference in its entirety.

BACKGROUND

The present invention relates to scaling operations in a video processing system, to resize image content with minimal artifacts.

"Scaling" generally refers to processes that alter the size of an image. Scaling may be performed as a format conversion operation in a video system. For example, when video images of low resolution (e.g., 480 p) are displayed on a high resolution panel (e.g., a full high definition (1080 p) panel), the video images need to be scaled to 1080 p. This kind of conversion has been referred to as an up-conversion. Also, video images of high resolution may need to be converted to be displayed on a low resolution panel (e.g., 1080 p to 480 p) or a smaller display area (e.g., Picture in Picture (PIP)). This kind of conversion has been referred to as a down-conversion or decimation.

Typically, scaling involves adjusting size of video images to be displayed. For example, an 4:3 image frame with resolution of 480 p has 720×480, or 345,600 pixels and an 16:9 image frame with resolution of 1080 p has 1920×1080, or 2,073,600 pixels. Thus, additional pixels need to be added to perform an up-conversion from 480 p to 1080 p and existing pixels need to be eliminated and/or combined to perform a down-conversion from 1080 p to 480 p.

Traditionally, interpolation has been used to add additional pixels between existing pixels for an up-conversion and decimation has been used to eliminate and/or combining existing pixels. Both interpolation and decimation involve passing image data through signal filters (e.g., a low pass filter (LPF)). However, in a 2-dimentional filtering, there is no ideal LPF and one dimension filtering often deteriorates image content along the other dimension. Various techniques have been developed to perform the scaling and also reduce the undesirable artifacts. However, existing techniques involve complex hardware structures and do not reduce the undesirable artifacts effectively. For example, various undesirable artifacts, such as saw tooth phenomenon, edge blurring, ringing and moiré artifacts, can cause distortions to images and affect the image quality after either an up-conversion or a down-conversion, but the existing techniques using complex hardware structures do not reduce these undesirable artifacts effectively.

Accordingly, there is a need to for a scaling system that can resize image data with minimal artifacts but uses hardware structures of reduced complexity.

BRIEF DESCRIPTION OF THE DRAWINGS

FIG. 3 illustrates a set of equations for determining coefficients of a parametric Farrow structure according to an embodiment of the present invention.

FIG. 10 illustrates an overshoot control according to an embodiment of the present invention.

DETAILED DESCRIPTION

Embodiments of the present invention are directed to an image processing system. The image processing system may comprise a content detection module having an input to receive a sequence of input pixels and configured to generate an adjustable parameter based on detected differences between adjacent pairs of input pixels, and a digital filter having an input for the sequence of input pixels and a control input coupled to an output of the content detection module. The digital filter may adjust filtering coefficients according to the parameter.

Figure 1:
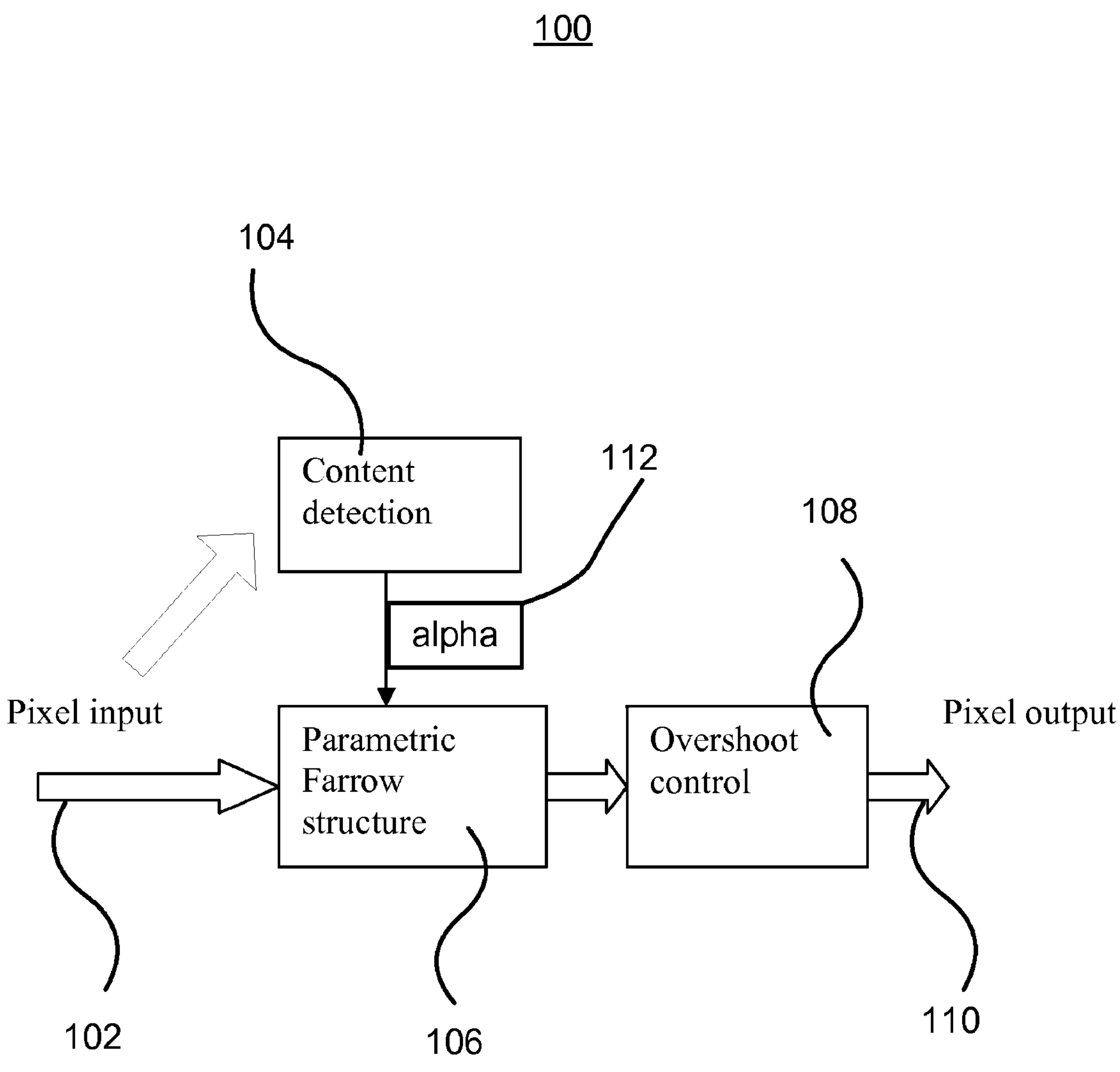
FIG. 1 illustrates a schematic diagram of an imaging system according to an embodiment of the present invention.

FIG. 1 illustrates a schematic diagram of an imaging system 100 according to an embodiment of the present invention. The imaging system 100 may comprise a content detection module 104, a parametric Farrow structure 106 and an overshoot control module 108. The parametric Farrow structure 106 may be a digital filter that processes input pixels and generate output pixels by applying coefficients to respective input pixels (e.g., by interpolation). The parametric Farrow structure 106 may be coupled to pixel input 102 to receive the input pixels. The content detection module 104 may determine a parameter alpha 112 based on input pixels to adjust the coefficients for the parametric Farrow structure 106. The overshoot module 108 control may limit output pixels from the Farrow structure 106 to be within a certain range of input pixels. In one embodiment, both the content detection module 104 and the overshoot control module 108 may be coupled to the parametric Farrow structure 106. The parametric Farrow structure 106 may generate output pixels based on the input pixels and the parameter alpha 112. The generated output pixels may be transmitted to the overshoot control module 108. The overshoot control module 108 may process the generated output pixels for overshoot control and output the generated pixels to the pixel output 110.

Embodiments of the present invention may apply interpolation/decimation to a variety of color spaces for images (e.g., red-green-blue (RGB), YIQ, YUV). In one embodiment, the content or frequency detection may be based on a YUV color space. Thus, for this embodiment, RGB input may need to be converted to YUV before being scaled and to be converted back from YUV to RGB after being scaled. For embodiments applied to YUV color space, alpha decision may apply on Y channel, UV may share the same alpha with Y. In some embodiments, the content or frequency detection may be based on RGB color space. In one or more embodiment, the 3 channels of RGB color space may have separate alpha decision module respectively.

Figure 2:
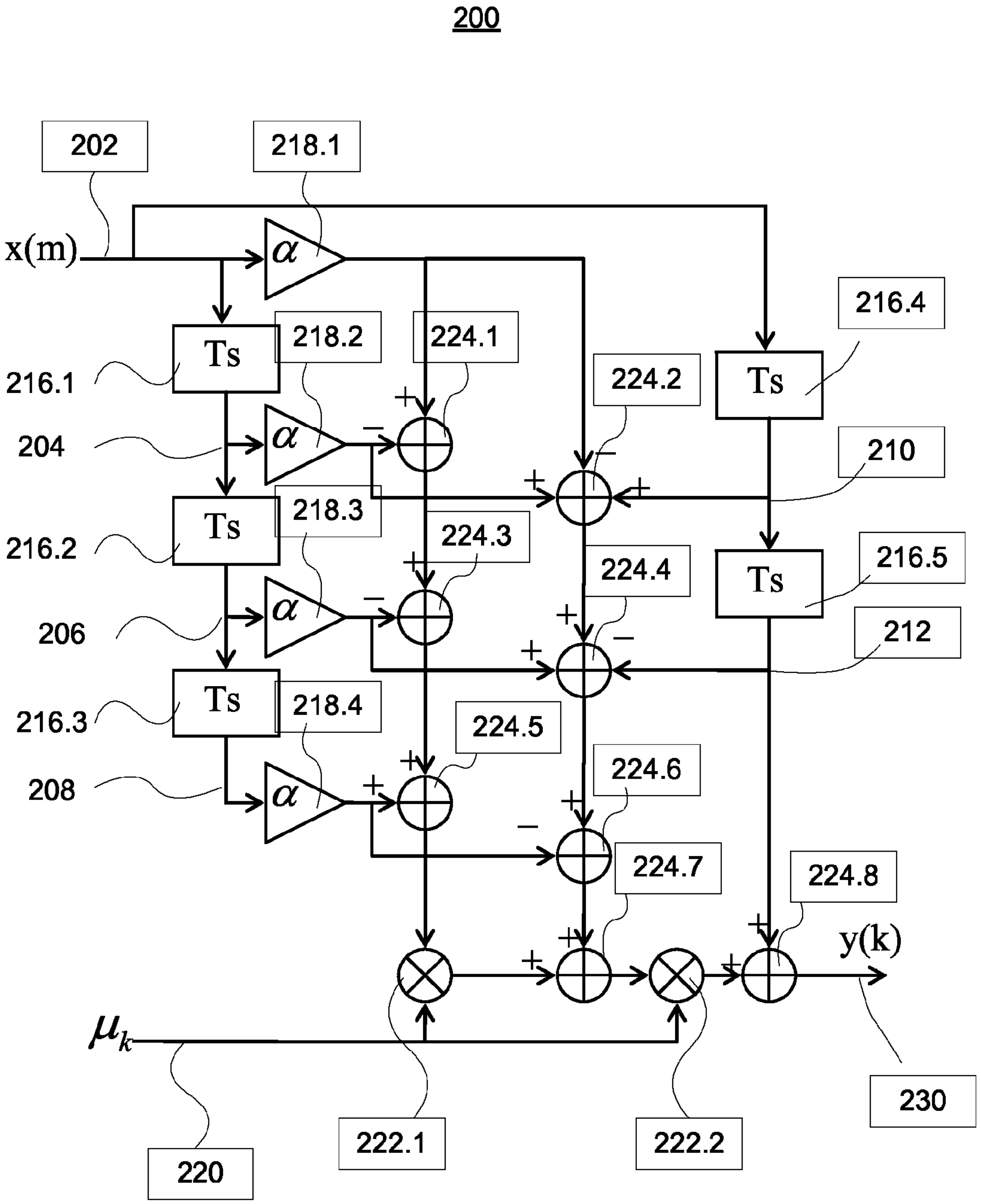
FIG. 2 illustrates a parametric Farrow structure according to an embodiment of the present invention.

FIG. 2 shows a parametric Farrow structure 200 according to the an embodiment of the present invention. The parametric Farrow structure 200 may comprise an input signal line 202, a position signal line 220, an output signal line 230, a plurality of delay elements 216.1-216.5 (collectively delay elements 216), four amplifiers 218.1-218.4 (collectively amplifiers 218), eight adders 224.1-224.8 (collectively adders 224) and two multipliers 222.1-222.2 (collectively multipliers 222).

The input signal line 202 may receive a sequence of input pixels x(m) (e.g., x(0), x(1)) one dimension of an image (e.g., horizontally or vertically). Each received input pixel may be applied to the amplifiers 218 and transmitted to delay elements 216. The amplifiers 218 may each amplify an input signal by a factor of alpha (α). For example, for an input of x(m), the output may be αx(m).

The delay elements 216 may each add one delay to a pixel. For example, if input signal at input signal line 202 is x(n), then the signal at point 204 and 210 (one delay element 216.1 and 216.4 away from x(n) respectively) is a previous pixel x(n−1), the signal at point 206 and 212 (two delay elements 216.1 and 216.2, and 216.4 and 216.5 away from x(n) respectively) is a previous pixel x(n−2), and the signal at point 208 (three delay elements 216.1, 216.2, and 216.3 away from x(n)) is a previous pixel x(n−3). In one embodiment, each delay element 216 may be a storage device, such as, but not limited to, a register.

The position signal line 220 may receive a position indicator $\mu_k$ identifying where a new pixel is to be generated. The position indicator $\mu_k$ may be multiplied (e.g., at the multipliers 222) to signals in the parametric Farrow structure 200. An output signal y(k) (e.g., a new pixel) may be generated on the output signal line 230 for the position identified by the position indicator $\mu_k$ based on input pixels. In one embodiment, the parametric Farrow structure 200 may be a four-point piecewise parabolic Farrow structure and referred to as a quadratic interpolator.

Figure 4:
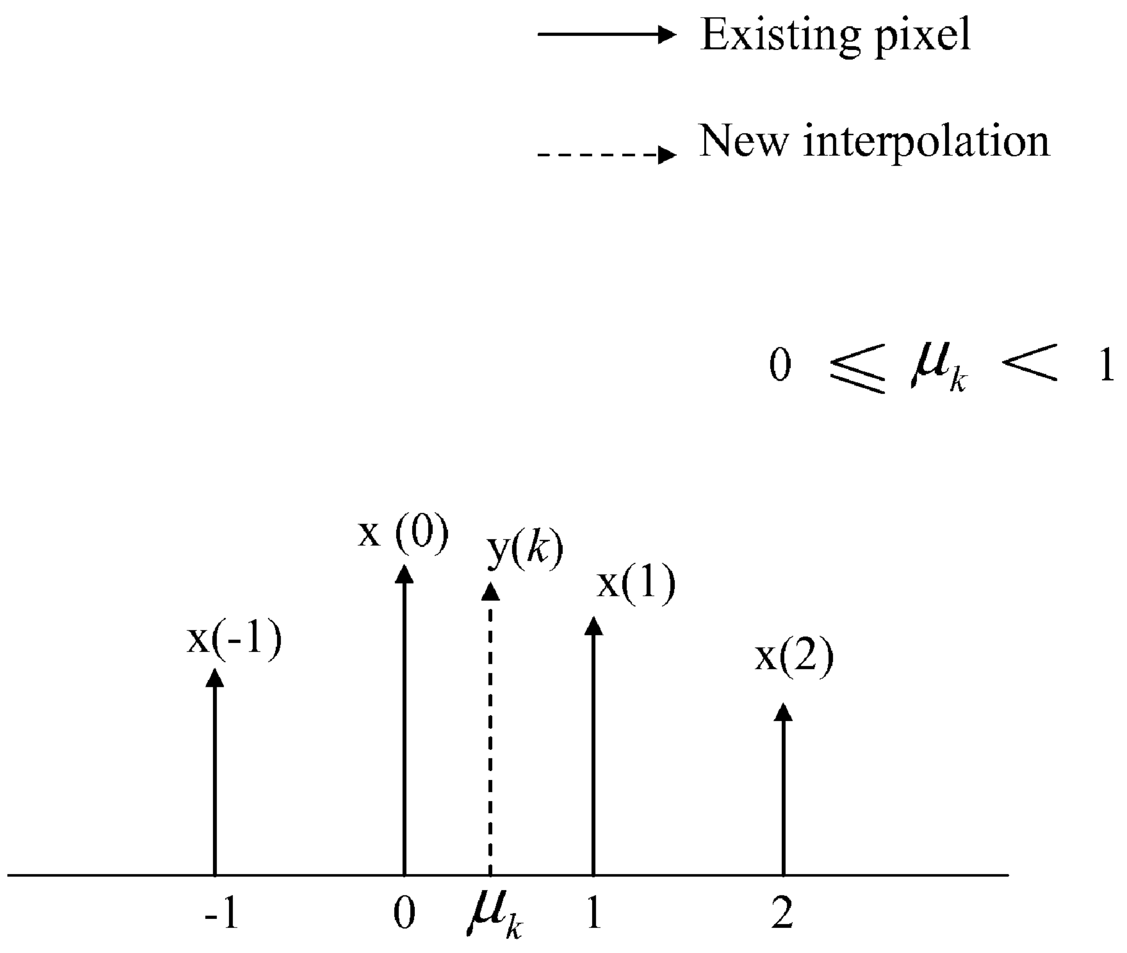
FIG. 4 illustrates a new pixel y(k) being added by a parametric Farrow structure according to an embodiment of the present invention.

FIGS. 3 and 4 illustrate operation of the parametric Farrow structure 200 according to an embodiment of the present invention. FIG. 4 shows a new pixel y(k) to be added at a position $\mu_k$ based on four input existing pixels (e.g., x(−1), x(0), x(1) and x(2)). FIG. 3 illustrates a set of equations for determining coefficients $C_{-1}$, $C_0$, $C_1$ and $C_2$ that may be applied to the four existing pixels according to an embodiment of the present invention. As shown in FIG. 4, the new pixel y(k) may be located at the position $\mu_k$ between two existing pixels x(0) and x(1). The parametric Farrow structure 200 may use two existing pixels before the position $\mu_k$ where the new pixel is to be added (e.g., x(−1) and x(0)) and two existing pixels after the position $\mu_k$ (e.g., x(1) and x(2)). In one embodiment, $\mu_k$ may be a value between zero (inclusive) and one (exclusive). The new pixel y(k) may be generated by the four input pixels x(−1), x(0), x(1) and x(2) as follows:

$$y(k)=C_2x(2)+C_1x(1)+C_0x(0)+C_{-1}x(-1).$$

Referring back to FIG. 2, when the input signal at input signal line 202 is x(2), the signal at points 204 and 210 may be x(1), the signal at points 206 and 212 may be x(0), and the signal at point 208 may be x(−1), respectively. As shown in FIG. 2, x(2) may be amplified by the amplifier 218.1 and added to the adder 224.1. Another input at the adder 224.1 may be a negative input from the amplifier 218.2, which amplifies signal x(1) at point 204. Accordingly, the adder 224.1 may generate an output of αx(2)−αx(1) to be input to the adder 224.3. The adder 224.3 may also have a negative input (e.g., −αx(0)) from the amplifier 218.3, which amplifies signal x(0) at point 206. Thus, the adder 224.3 may generate an output of αx(2)−αx(1)−αx(0) to be input to the adder 224.5. The adder 224.5 may add the output from the adder 224.3 and an output from the amplifier 218.4 (e.g., αx(−1)) and have an output of αx(2)−αx(1)−αx(0)+αx(−1). The output of the adder 224.5 may be multiplied to the position signal $\mu_k$ at the multiplier 222.1. The multiplier 222.1 may thus have an output of $(\alpha x(2)-\alpha x(1)-\alpha x(0)+\alpha x(-1))\mu_k$.

Similarly, input to the adder 224.2 are signals from the amplifier 218.1 (negative input), amplifier 218.2 and point 210. The adder 224.2 thus may generate an output of −αx(2)+αx(1)+x(1). The adder 224.4 may add the output from the adder 224.2 to the signal from the amplifier 218.3 (e.g., +αx(0)) and subtract the signal from the point 212 (e.g., −x(0)). Accordingly, the adder 224.4 may generate an output signal of −αx(2)+(α+1)×(1)+(α−1)×(0). The output from the adder 224.2 may be added at the adder 224.6 with a negative signal from the amplifier 218.4 (e.g., −αx(−1)). Thus, the adder 224.6 may have an output of $$-\alpha x(2)+(\alpha+1)x(1)+(\alpha-1)x(0)-\alpha x(-1).$$

The output of the multiplier 222.1 and the adder 224.6 may be added at the adder 224.7. Then, the sum of output of the multiplier 222.1 and the adder 224.6 may be multiplied by $\mu_k$ at the multiplier 222.2. Finally, the generated signal y(k) may be generated at the adder 224.8, which may sum up the output signal from the multiplier 222.2 with the signal at the point 212 (e.g., x(0)). Therefore, the generated signal y(k) may be as follows and the coefficients $C_{-1}$, $C_0$, $C_1$ and $C_2$ for each existing input pixels x(−1), x(0), x(1) and x(2) may be determined as shown in FIG. 3:

$$y(k)=(\alpha x(2)-\alpha x(1)-\alpha x(0)+\alpha x(-1))\mu_k^2+(-\alpha x(2)+(\alpha+1)x(1)+(\alpha-1)x(0)-\alpha x(-1))\mu_k+x(0).$$

Figure 5:
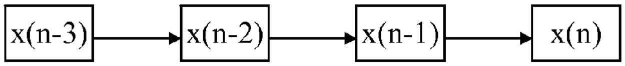
FIG. 5 illustrates a set of conditions to determine the values for the adjustable parameter alpha according to an embodiment of the present invention.
Figure 6A:
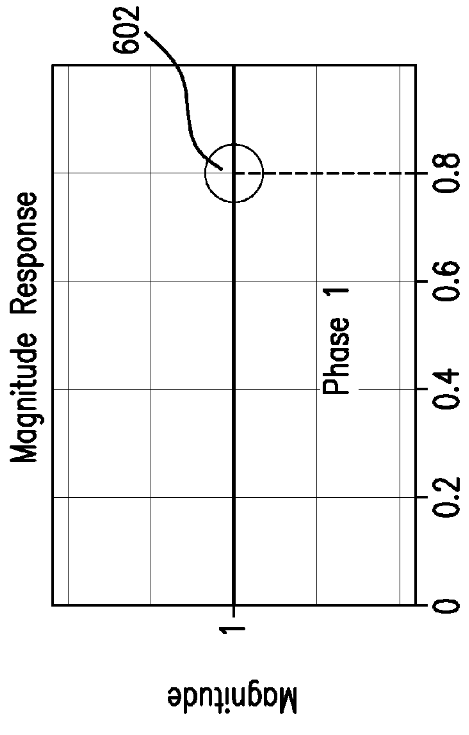
FIG. 6 illustrates magnitude responses for different phases of a conventional polyphase filter.
Figure 6B:
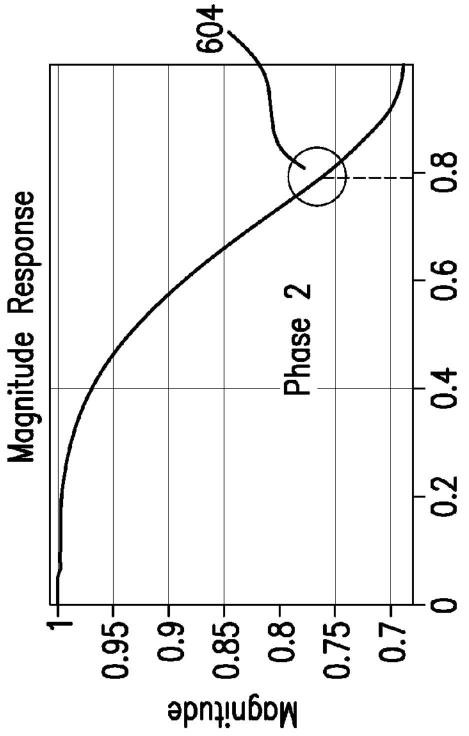
Figure 6C:
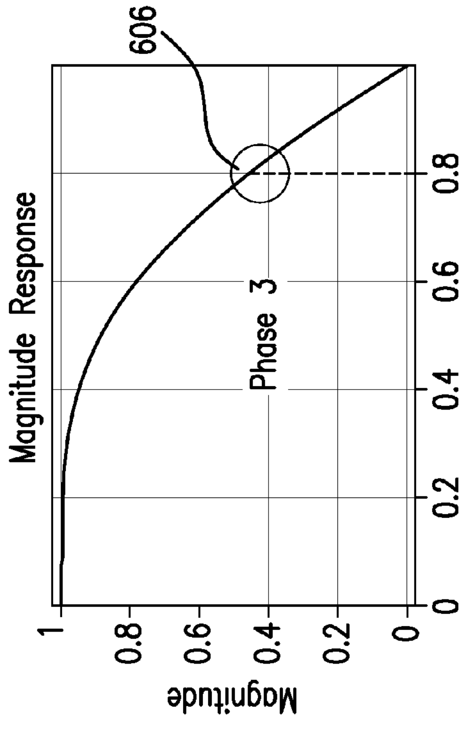
Figure 6D:
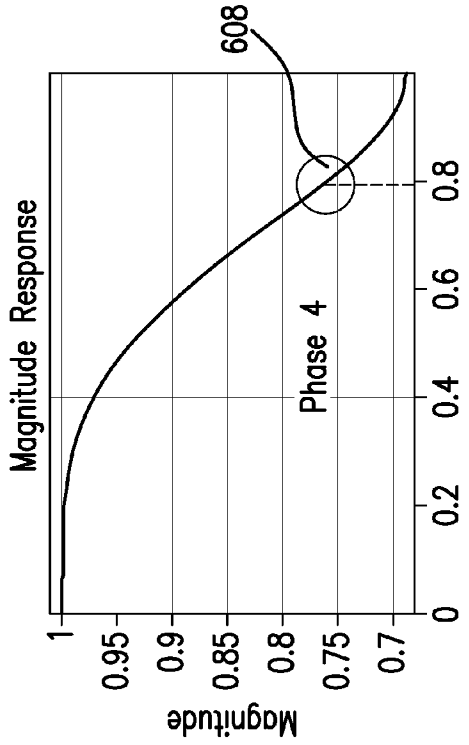
Figure 7A:
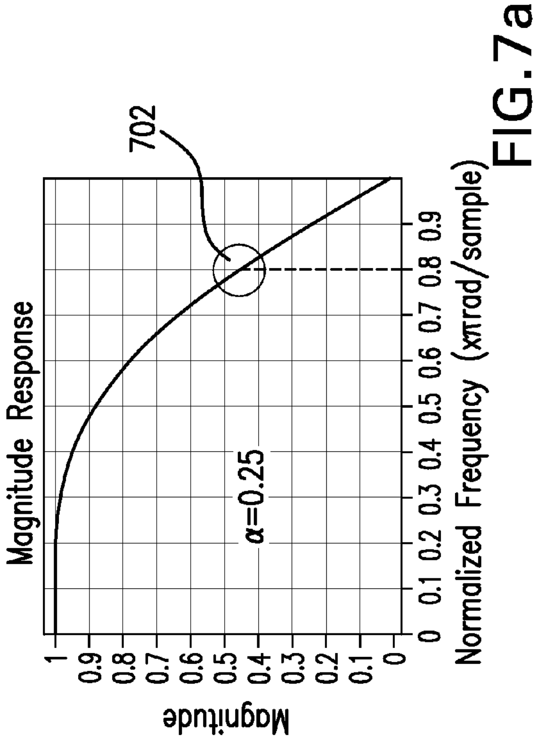
FIG. 7 illustrates magnitude responses for a parametric Farrow structure according to an embodiment of the present invention.
Figure 7B:
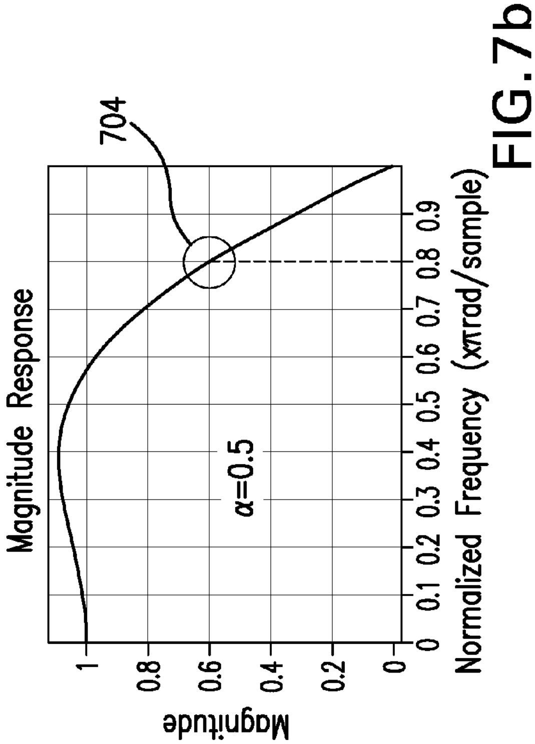
Figure 7C:
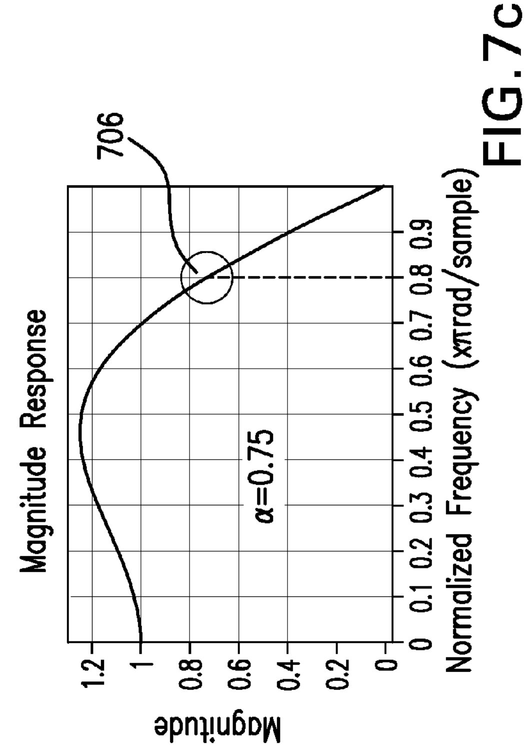
Figure 7D:
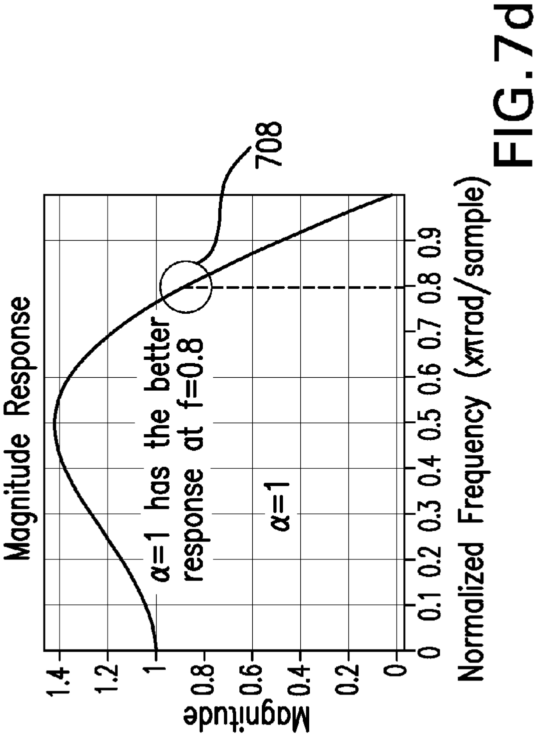

FIG. 5 illustrates a set of conditions to determine the values for the adjustable parameter alpha according to an embodiment of the present invention. Value of a new pixel to be inserted may depend on values of input pixels before and after the position of insertion. In particular, the value of the new pixel may depend on differences between adjacent input pixels. For example, the difference between the input pixels immediate before and after the position of insertion may play a bigger role in contributing to the new pixel then differences between pixels further away from the position of insertion. The content detection module 104 according to an embodiment of the present invention may determine the value of the parameter alpha dynamically based on content (e.g., differences between adjacent pixels). As shown in FIG. 5, for example, values of a sequence of existing pixels (e.g., x(n−3), x(n−2), x(n−1) and x(n)) may be used to determine the value of the parameter alpha for new pixel(s) to be inserted between the second and third pixel of the sequence (e.g., x(n−1) and x(n−2)).

In one embodiment, the value of alpha may be determined by checking the set of conditions A, B, C, D, E, F, G and H. The set of conditions A, B, C, D, E, G and H may then derive an appropriate alpha for a new pixel to be inserted between x(n−2) and x(n−1) (e.g., x(0) and x(1) of FIG. 4). The content detection module (e.g., content detection module 104 of FIG. 1) may determine the differences between the input pixels and determine the value of the parameter alpha. In some embodiments, 5 levels (e.g., five values for the adjustable parameter alpha) may be used: high, intermediate high, middle, low, off. In one embodiment, the five levels may correspond to: 1, 0.75, 0.5, 0.25, 0. Conditions A, B, C, D and E may be directed to differences between the input pixels immediately before and immediately after a newly inserted pixel (e.g., x(n−2) and x(n−1)). Conditions G and H may be directed to differences between neighboring pairs of input pixels close to the position of insertion.

The value of the parameter alpha may be determined solely on the difference between the pixels immediately before and immediately after the insertion position if the difference is in a certain range (e.g., difference between values of x(n−2) and x(n−1) in a certain range). For example, alpha may be high (e.g., 1) if the difference between x(n−2) and x(n−1) is greater than or equal to a top threshold (e.g., the absolute value of the difference may be greater than or equal to 96 shown in FIG. 5 as condition A). Further, alpha may be intermediate high (e.g., 0.75) if the difference between x(n−2) and x(n−1) is between the top threshold and an intermediate threshold (e.g., the absolute value of the difference may be between 96 (exclusive) and 64 (inclusive) shown in FIG. 5 as condition B).

If neither of the above two situations applies, alpha may be middle (e.g., 0.5) if the difference between x(n−2) and x(n−1) is between the intermediate threshold and an intermediate low threshold (e.g., the absolute value of the difference may be between 64 (exclusive) and 32 (inclusive) shown in FIG. 5 as condition C). If the difference between x(n−2) and x(n−1) is very low but not extremely low, for example, between the intermediate low threshold and a bottom threshold (e.g., the absolute value of the difference may be between 32 (exclusive) and 16 (inclusive) shown in FIG. 5 as condition D), alpha may be middle (e.g., 0.5) if the differences of neighboring pairs of input pixels are greater than an upper threshold (e.g., both absolute values of difference between x(n−3) and x(n−2), and difference between x(n−1) and x(n) are greater than 64, shown as condition G in FIG. 5). If the difference between x(n−2) and x(n−1) is extremely low, for example, less than the bottom threshold (e.g., the absolute value of the difference may be less than 16, shown in FIG. 5 as condition E), alpha may still be middle (e.g., 0.5) if the differences of neighboring pairs of input pixels are greater than a lower threshold (e.g., both absolute values of difference between x(n−3) and x(n−2), and difference between x(n−1) and x(n) are greater than 32, shown in FIG. 5 as condition H).

If the difference between x(n−2) and x(n−1) is very low but not extremely low, for example, between the intermediate low threshold and the bottom threshold (e.g., the absolute value of the difference may be between 32 (exclusive) and 16 (inclusive)), alpha may be low (e.g., 0.25) if either or both differences of neighboring pairs of input pixels are less than or equal to the upper threshold (e.g., either or both absolute values of difference between x(n−3) and x(n−2), and difference between x(n−1) and x(n) are less than or equal to 64, shown as condition G equaling to zero in FIG. 5). Finally, if the difference between x(n−2) and x(n−1) is extremely low, for example, less than the bottom threshold (e.g., the absolute value of the difference may be less than 16), alpha may be set to 0 if either of both of the differences of neighboring pairs of input pixels are less than or equal to the lower threshold (e.g., not both absolute values of difference between x(n−3) and x(n−2), and difference between x(n−1) and x(n) are greater than 32, shown in FIG. 5 as condition H==0).

The values for various thresholds may be adjusted and/or determined by a system designer. For example, in another embodiment, the top threshold value may be 100, the intermediate threshold value may be 50, the intermediate low threshold value may be 25, the bottom threshold value may be 10, the upper threshold may be 48 and the lower threshold may be 24.

Thus, as shown in FIG. 5, in one embodiment, the value of alpha may be determined by sequence of input pixels. Accordingly, the coefficients of an Farrow structure according an embodiment of the present invention may be adaptive based on the sequence of input pixels (e.g., existing pixels before and after the inserted the pixel), and interpolation may be based on the image content (e.g., differences between the pixels). Moreover, the criteria for the determination according an embodiment of the present invention may be adjusted as needed.

As described above, a signal processing structure may act as a signal filter. The signal filter typically has different effects for different frequencies. FIG. 6 shows magnitude responses for different frequencies at different phases (e.g., $\mu_k$=0, $\mu_k$=0.25, $\mu_k$=0.5 and $\mu_k$=0.75 respectively) for a traditional polyphase structure. In each of FIGS. 6(*a*), 6(*b*), 6(*c*) and 6(*d*), the horizontal axis may be frequency and the vertical axis may be magnitude response of the traditional polyphase structure for a respective phase (e.g., $\mu_k$). If the filter is an ideal low pass filter (LPF), the frequency response should be all equal to 1. But as shown in FIG. 6(*a*), at the frequency point f=0.8, the first phase's response is 1 (e.g., point 602), as shown in FIGS. 6(*b*) and 6(*d*), the second and fourth phases both have a response of about 0.75 (e.g., point 604 and 608 respectively); and as shown in FIG. 6(*c*), the third phase's response is about 0.4 (e.g., point 606). Thus, a traditional polyphase structure is far from an ideal LPF and may cause a dramatic distortion to an image being processed. This dramatic distortion in fact is a direct cause of saw tooth edge, which is a well-known undesirable artifact in signal processing.

For example, if an image is to be scaled by four, three additional pixels may be inserted between two adjacent existing pixels (e.g., at $\mu_k$=0.25, $\mu_k$=0.5 and $\mu_k$=0.75 between pixels zero (0) and one (1) of FIG. 4). Using a traditional polyphase structure with magnitude responses as shown in FIG. 6, the pixel inserted at $\mu_k$=0.5 will lose more than half of magnitude for frequency 0.8.

Embodiments of the present invention may adjust the parameter alpha (thus the coefficients of the parametric Farrow structure) according to the frequency level of an image to make it have consistent response at different phases. The adjustment may be have the effect of changing parameters of a digital filter to achieve desired frequency responses for a variety of frequencies dynamically. When image is scaled up by 4, take phase 3 ($\mu_k$==0.5), for example, as mentioned above, different parameter alpha may generate a different frequency response.

FIG. 7 shows magnitude responses for four different values of parameter alpha according to an embodiment of the present invention for an interpolation at phase 3 ($\mu_k$==0.5). For example, at the frequency point f=0.8, a parametric Farrow structure according to an embodiment of the present invention with a parameter alpha having a value of 0.25 may have a magnitude response of less than 0.5 (e.g., point 702 in FIG. 7(*a*)). This embodiment of the parametric Farrow structure may have a magnitude response of about 0.6 at the frequency point f=0.8 as shown in FIG. 7(*b*) (e.g., point 704) for the parameter alpha having a value of 0.5. In FIG. 7(*c*), this embodiment of the parametric Farrow structure may have a magnitude response of about 0.7 at the frequency point f=0.8 (e.g., point 706) for the parameter alpha having a value of intermediate high (e.g., 0.75). In FIG. 7(*d*), this embodiment of the parametric Farrow structure may have a magnitude response of about 0.8 at the frequency point f=0.8 (e.g., point 708) for the parameter alpha having a value of 1.

As shown in FIG. 7, different values of the parameter alpha may have a different frequency response. Therefore, in one embodiment, the parameter alpha may be adjusted to make the spectrum flat, that is, make the magnitude response to be higher (e.g., to approach one) for a frequency and thus make the magnitude response more like the ideal LPF spectrum.

In one embodiment, the content detection module may detect frequency levels of existing pixels and adjust and/or choose a value for the parameter alpha that may cause the parametric Farrow structure to generate a consistent magnitude response. Depending upon local frequency characteristic, the parameter alpha may be configured to one of: high, intermediate high, middle, low and off (e.g., 1, 0.75, 0.6, 0.25 and 0). For example, as shown in FIG. 7, $\alpha=1$ may have a better response at f=0.8 in one embodiment). Therefore, in one embodiment, it may be easy to adjust the parameter to make the spectrum flat, and make the magnitude response more like an ideal LPF spectrum.

Embodiments of the present invention may help reduce undesirable artifacts. One of the artifacts when applying up-conversion (e.g., scale up) on image may be staircase. Staircase is caused mainly by unequal frequency responses on different phases (e.g., FIG. 6). In one embodiment, by adjusting the frequency responses for different phases, a parametric Farrow structure may achieve a better or equal gain at the same frequency point (e.g., FIG. 7). Thus, the staircase artifact may be greatly reduced. Another of the artifacts when applying up-conversion on images may be blurring. In one embodiment, by adjusting the frequency responses for different phases, the whole frequency response may be bigger than any traditional filters. Thus, the embodiment may increase the sharpness of an edge.

Figure 8:
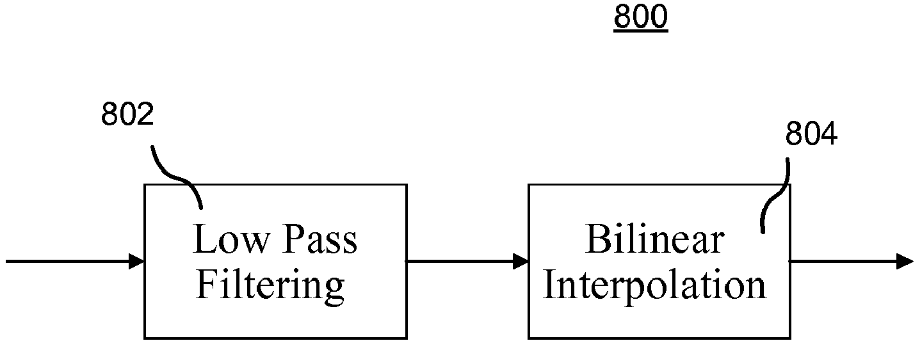
FIG. 8 illustrates a process to use a parametric Farrow structure for down-conversion according to an embodiment of the present invention.

FIG. 8 illustrates a process 800 to use a parametric Farrow structure for down-conversion according to an embodiment of the present invention. The process 800 may comprise two steps. At step 802, the parametric Farrow structure may be used as a low pass filter. Existing pixels may be processed by the low pass filter to merge several adjacent pixels into one generated intermediate pixel. At step 804, the parametric Farrow structure may be used to perform bilinear interpolation from the generated intermediate pixels to derive a final pixel from original existing pixels. In one embodiment, to perform bilinear interpolation, the parametric Farrow structure may perform a linear interpolation first in one direction, and then again in the other direction (e.g., horizontal then vertical, or vertical then horizontal).

Figure 9:
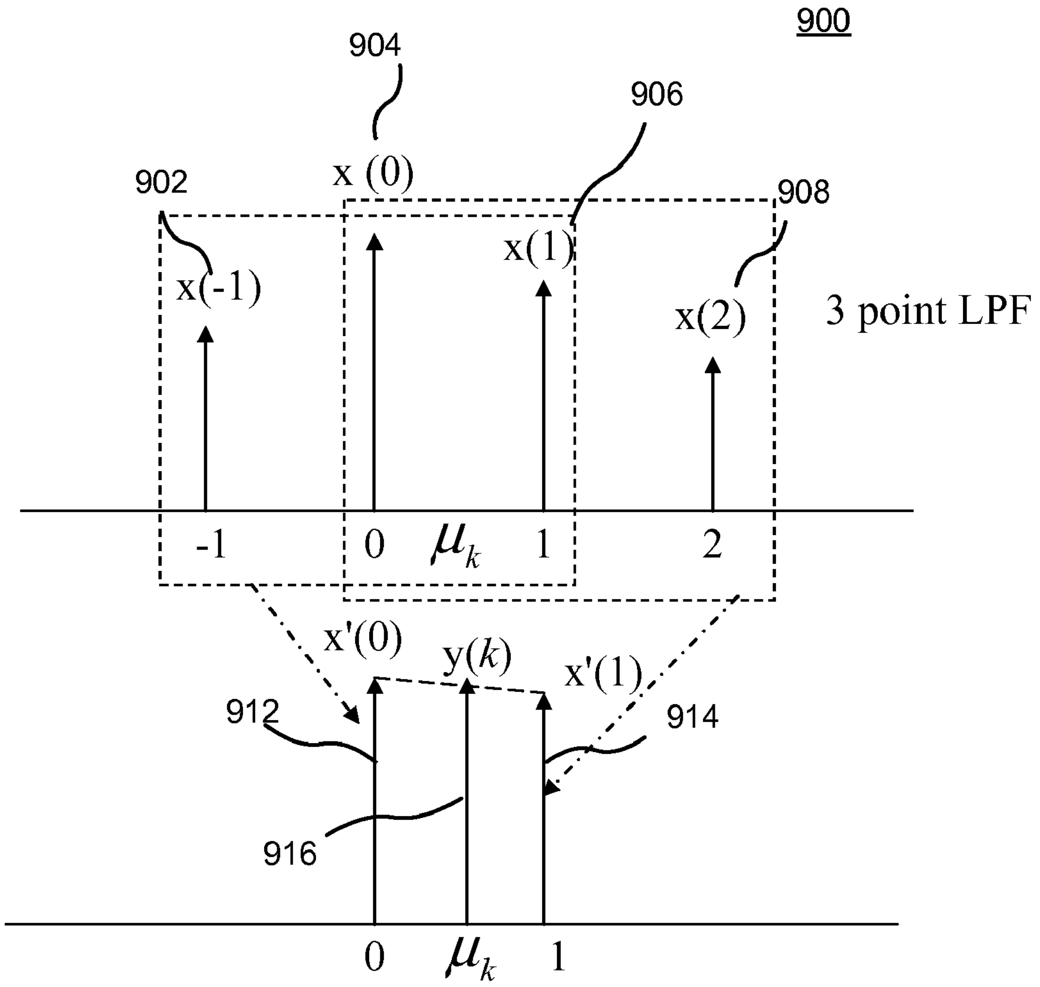
FIG. 9 illustrates a down-conversion process using a parametric Farrow structure according to an embodiment of the present invention.

FIG. 9 illustrates the process 800 by an example of merging four existing pixels into one pixel. Four existing pixels x(−1), x(0), x(1) and x(2) may be input to a parametric Farrow structure according to an embodiment of the present invention (e.g., the parametric Farrow structure of FIG. 2). The parametric Farrow structure may be used as a 3 points low pass filter (LPF). The 3 points LPF may process the first three consecutive pixels x(−1), x(0) and x(1) to generate a first intermediate pixel x'(0). The parametric Farrow structure may then process the next three consecutive pixels x(0), x(1) and x(2) to generate a second intermediate pixel x'(1). Finally, the parametric Farrow structure may apply linear interpolation to the intermediate pixels x'(0) and x'(1) to generate a final pixel y(k) at the position $\mu_k$ between the existing pixel x(0) and x(1). This process may be applied in two dimensions thus may be referred to as a bilinear interpolation. In one embodiment, both the 3 points LPF and linear interpolation may be performed for two dimensions. The linear interpolation may thus become a bilinear interpolation.

In one embodiment, the 3 points LPF may generate the intermediate pixel by summing one quarter of a preceding pixel, one half of a middle pixel and one quarter of a succeeding pixel. For example, the first intermediate pixel x'(0) may be generated as ¼x(−1)+½x(0)+¼x(1) and the second intermediate pixel x'(1) may be generated as ¼x(0)+½x(1)+¼x(2). In one embodiment, the parametric Farrow structure may be a parametric Farrow structure shown in FIG. 2 adjusted by additional switches. The additional switches may select the signals in FIG. 2 for up-conversion and select a set of coefficients of, for example, $C_1=¼$, $C_0=½$, $C_1=¼$ and $C_2=0$, or $C_{-1}=0$, $C_0=¼$, $C_1=½$, and $C_2=¼$, for down conversion.

In one embodiment, the down-scaling according to the present disclosure may set alpha to 0 to a parametric Farrow structure for bilinear interpolation operations. Applying alpha as 0 to the set of coefficients shown in FIG. 3, the coefficients may become $C_{-1}=0$, $C_0=1-\mu_k$, $C_1=\mu_k$ and $C_2=0$. Thus, y(k) may be the sum of $(1-\mu_k)$x'(0) and $\mu_k$x'(1) (e.g., a linear interpolation for two points).

Down scaling or decimation is another important technology in image scaling. It has application such as PIP (picture in picture). For these kind of picture scaling (e.g., down-conversion) applications, moiré pattern is usually induced due to frequency aliasing (e.g., known as aliasing artifact). Normally, an anti-aliasing filter (e.g., LPF) is needed to reduce aliasing in high frequency, especially for large scale decimation. But an LPF may increase additional hardware cost. The pass-band of the LPF should be proportional to decimation scale. In embodiments according to present disclosure, the parameter of Farrow structure filter may be selected to achieve a proper frequency response (e.g., suppressing the high frequency content to a large level) and greatly reduce the moire artifact without additional hardware.

Embodiments of the present invention may apply overshoot/undershoot control to any scaling (e.g., interpolation or decimation) process. FIG. 10 illustrates an overshoot control according to an embodiment of the present invention. Overshoot (or undershoot) may occur during signal processing when an output signal of a filter fall outside a certain scope of the maximum (or minimum) of the input signal, for example, if the output signal y(k) of FIG. 4 is much larger than the maximum of four input signals (e.g., x(0)), or much smaller than the minimum of four input signals (e.g., x(2)). In one embodiment, the output signal may be determined according to a formula shown in FIG. 10. Max and min may represent maximum and minimum value of the four input pixels. Offset may be a global parameter applied to all images being scaled. Therefore, the output pixel's value may be limited to a certain range based on the four input pixels and thereby the overshoot control according to the present invention may prevent the new interpolation to be too large or too small in value and appearing overshoot.

Because of the adjustable parameter, embodiments of the parabolic Farrow structure according to the present disclosure may become adaptive LPFs and thus, decimation may share the same computing circuit with interpolation as described above with respect to FIGS. 8 and 9.

Embodiments according to the present disclosure may generate new pixels adaptively and produce smoother and sharper images. The performance may be obtained by adjusting frequency response for different frequency spectrum. A parametric quadratic kernel is employed which has lower cost and higher high frequency response compared with traditional Lagrange cubic. Moreover, the frequency response may be adjusted by modifying a parameter, which may be determined by content of the image.

The parametric Farrow structure according to an embodiment of the present invention may be more cost efficient. For example, the coefficients of the parametric Farrow structure

200 may be calculated dynamically, thus eliminating look up tables (LUT). Further, the dynamically generated coefficients may be adjusted based on the parameter alpha. In one or more embodiments, the parameter alpha may be adjusted according to content of an image being processed. That is, the coefficients may be generated dynamically based on existing surrounding pixels. In one embodiment, the interpolation may be performed as vertical first, then horizontal.

Embodiments of the present invention may have a parametric quadratic kernel. The parametric quadratic kernel may have following characteristics. First, it may have a low cost. For example, compared to a traditional Farrow structure (e.g., a traditional cubic Farrow structure), for a four-tap Farrow structure (e.g., using four existing pixels), only 2 multiplications and 8 adders in each direction and each channel may be needed. Second, the coefficients may be adaptive. For example, a parameter could be adjusted to make the coefficients have best frequency spectrum while the original Lagrange Farrow's kernel function is fixed. Third, it may achieve a ringing reduction. Because the ringing region in image is considered to be low frequency, adaptive frequency response may mitigate the effects and will not magnify the ringing.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. An image processing system, comprising:

a content detection module having an input to receive a sequence of input pixels and configured to generate an adjustable parameter alpha ($\alpha$) based on differences among every four consecutive input pixels; and a digital filter having an input for the sequence of input pixels and a control input coupled to an output of the content detection module, the digital filter adjusting filtering coefficients according to the parameter to generate one output pixel for every four consecutive input pixels, wherein each output pixel is generated by multiplying four coefficients $C_{-1}$, $C_0$, $C_1$ and $C_2$ to the sequence of four consecutive input pixels x(−1), x(0), x(1) and x(2) respectively and adding the multiplication results as represented by an equation of $$y(k)=C_2x(2)+C_1x(1)+C_0x(0)+C_{-1}x(-1),$$

wherein x(−1) is the first input pixel in the four consecutive input pixels, x(0) is the second, x(1) is the third and x(2) is the last, the generated output pixel is between x(0) and x(1), the four coefficients are determined from the adjustable parameter $\alpha$ by the following equations:

$$C_{-1}=\alpha\mu_k^2-\alpha\mu_k,$$

$$C_0=-\alpha\mu_k^2+(\alpha-1)\mu_k+1,$$

$$C_1=-\alpha\mu_k^2+(\alpha-1)\mu_k,$$

$$C_2=\alpha\mu_k^2-\alpha\mu_k,$$

and $0\leqq\mu_k<1$.

2. The image processing system of claim 1, wherein the digital filter is a multi point Farrow structure.

3. The image processing system of claim 2, wherein the image processing system is configured to generate pixels for up-conversion of an image using the filtering coefficients.

4. The image processing system of claim 3, wherein the adjustable parameter is determined by differences between the pixels x(−1) and x(0), the pixels x(0) and x(1), and the pixels x(1) and x(2) of the sequence.

5. The image processing system of claim 3, wherein the adjustable parameter has a value of one of: high, intermediate high, middle, low and off.

6. The image processing system of claim 5, wherein the adjustable parameter has the high value when the difference between the pixels of x(0) and x(1) is greater than or equal to a first threshold value.

7. The image processing system of claim 5, wherein the adjustable parameter has the intermediate high value when the difference between the pixels x(0) and x(1) is less than the first threshold value but greater than or equal to a second threshold value.

8. The image processing system of claim 5, wherein the adjustable parameter has the middle value when the difference between the pixels x(0) and x(1) is less than the second threshold value but greater than or equal to a third threshold value.

9. The image processing system of claim 5, wherein the adjustable parameter has a middle value when 1) the difference between the pixels x(0) and x(1) is less than the third threshold value but greater than or equal to a fourth threshold value; and 2) both of the differences between the pixels x(−1) and x(0), and between the pixels x(1) and x(2) are greater than a fifth threshold.

10. The image processing system of claim 5, wherein the adjustable parameter has a middle value when 1) the difference between the pixels x(0) and x(1) is less than the fourth threshold value; and 2) both of the differences between the pixels x(−1) and x(0), and between the pixels x(1) and x(2) are greater than a sixth threshold.

11. The image processing system of claim 5, wherein the adjustable parameter has a low value when 1) the difference between the pixels x(0) and x(1) is less than the fourth threshold value; and 2) both of the differences between the pixels x(−1) and x(0), and between the pixels x(1) and x(4) are greater than a sixth threshold.

12. The image processing system of claim 5, wherein the adjustable parameter is off when 1) the difference between the pixels of x(0) and x(1) is less than the fourth threshold value; and 2) both of the differences between the pixels x(−1) and x(0), and between the pixels x(1) and x(2) are greater than a sixth threshold.

13. The image processing system of claim 5, wherein the adjustable parameter is selected based on frequency spectrum of input pixels.

14. The image processing system of claim 3, wherein the image comprises a horizontal dimension and a vertical dimension, and the sequence of input pixels is in one of the horizontal and the vertical dimension.

15. The image processing system of claim 1, further comprising an overshoot control that limits generated pixels by the digital filter to be within a range determined by the input pixels.

16. The image processing system of claim 1, wherein the image processing system is configured to perform decimation based on input pixels.

17. The image processing system of claim 16, wherein the image processing system performs decimation by performing a low pass filtering and bilinear interpolation.

18. A method for resizing an input image, comprising:

receiving a sequence of input pixels comparing values of each pair of adjacent input pixels;

determining a value of an adjustable parameter alpha $\alpha$ based on the difference of values of each pair of adjacent input pixels;

calculating coefficients to be applied to input pixels based on a position for a new pixel and the adjustable parameter, the coefficients being applied to input pixels in a digital filter; and generating, by the digital filter, the new pixel using the calculated coefficients, wherein the new pixel is generated by multiplying four coefficients $C_{-1}$, $C_0$, $C_1$ and $C_2$ to a sequence of four consecutive input pixels x(−1), x(0), x(1) and x(2) respectively and adding the multiplication results as represented by an equation of $$y(k)=C_2x(2)+C_1x(1)+C_0x(0)+C_{-1}x(-1),$$

wherein x(−1) is the first input pixel of the four consecutive input pixels, x(0) is the second, x(1) is the third and x(2) is the last, the generated new pixel is between x(0) and x(1), the four coefficients are determined from the adjustable parameter α by the following equations:

$$C_{-1}=\alpha\mu_k^2-\alpha\mu_k,$$

$$C_0=-\alpha\mu_k^2+(\alpha-1)\mu_k+1,$$

$$C_1=-\alpha\mu_k^2+(\alpha+1)\mu_k,$$

$$C_2=\alpha\mu_k^2-\alpha\mu_k,$$

and $0\leqq\mu_k<1$.

19. The method of claim 18, wherein the input image comprises a horizontal dimension and a vertical dimension, and the sequence of input pixels is in one of the horizontal and the vertical dimension.

20. The method of claim 18, wherein the digital filter is a four-point parabolic Farrow structure.

21. The method of claim 20, wherein the value of the adjustable parameter is one of: high, intermediate high, middle, low and off.

22. The method of claim 21, wherein the adjustable parameter:

has a value of high when the difference between the second and third pixels of the sequence is greater than or equal to a first threshold value;

has a value of intermediate high when the difference between the second and third pixels of the sequence is less than the first threshold value but greater than or equal to a second threshold value;

has a value of middle when (1) the difference between the second and third pixels of the sequence is less than the second threshold value but greater than or equal to a third threshold value; or (2) the difference between the second and third pixels of the sequence is less than the third threshold value but greater than or equal to a fourth threshold value, and both of the differences between the first and second pixels, and between the third and fourth pixels of the sequence are greater than a fifth threshold; or (3) the difference between the second and third pixels of the sequence is less than the fourth threshold value, and both of the differences between the first and second pixels, and between the third and fourth pixels of the sequence are greater than a sixth threshold;

has a value of low when 1) the difference between the second and third pixels of the sequence is less than the fourth threshold value, and 2) both of the differences between the first and second pixels, and between the third and fourth pixels of the sequence are greater than a sixth threshold; and is off when 1) the difference between the second and third pixels of the sequence is less than the fourth threshold value; and 2) both of the differences between the first and second pixels, and between the third and fourth pixels of the sequence are greater than a sixth threshold.

23. The method of claim 20, wherein the generated pixel is transmitted to an overshoot control before being output.

24. The image processing system of claim 20, wherein the value of the adjustable parameter is determined based on frequency spectrum of input pixels.

* * * * *

UNITED STATES PATENT AND TRADEMARK OFFICE

CERTIFICATE OF CORRECTION

PATENT NO. : 8,346,021 B2
APPLICATION NO. : 12/505626
DATED : January 1, 2013
INVENTOR(S) : Lin Li et al.

It is certified that error appears in the above-identified patent and that said Letters Patent is hereby corrected as shown below:

In the Claims

In column 9, line 57, Claim 1, change "$C_1 = -\alpha\mu_k^2 + (\alpha - 1)\mu_k$," to -- $C_1 = -\alpha\mu_k^2 + (\alpha + 1)\mu_k$, --

Signed and Sealed this
Eighteenth Day of June, 2013

Teresa Stanek Rea
*Acting Director of the United States Patent and Trademark Office*